(12) United States Patent
Schultze

(10) Patent No.: US 8,457,163 B2
(45) Date of Patent: Jun. 4, 2013

(54) METHOD FOR DATA TRANSMISSION VIA DATA NETWORKS

(75) Inventor: Stephan Schultze, Lohr am Main (DE)

(73) Assignee: Robert Bosch GmbH, Stutgart (DE)

( * ) Notice: Subject to any disclaimer, the term of this patent is extended or adjusted under 35 U.S.C. 154(b) by 307 days.

(21) Appl. No.: 13/034,825

(22) Filed: Feb. 25, 2011

(65) Prior Publication Data
US 2011/0164629 A1    Jul. 7, 2011

Related U.S. Application Data

(63) Continuation of application No. 11/672,777, filed on Feb. 8, 2007, now Pat. No. 7,940,803.

(30) Foreign Application Priority Data

Feb. 10, 2006    (DE) .......................... 10 2006 006 508

(51) Int. Cl.
    *H04J 3/06* (2006.01)
(52) U.S. Cl.
    USPC .......................................... 370/503; 370/429

(58) Field of Classification Search
    USPC ................. 370/412, 428, 429, 465, 474, 503,
                       370/442, 443, 445, 394, 401
    See application file for complete search history.

(56) References Cited

U.S. PATENT DOCUMENTS

| | | | | |
|---|---|---|---|---|
| 7,463,643 | B2 * | 12/2008 | Franke et al. | 370/442 |
| 2002/0064157 | A1 * | 5/2002 | Krause | 370/393 |
| 2006/0161705 | A1 * | 7/2006 | Schultze et al. | 710/106 |

* cited by examiner

*Primary Examiner* — Mark Rinehart
*Assistant Examiner* — Matthew Hopkins
(74) *Attorney, Agent, or Firm* — Michael J. Striker

(57) ABSTRACT

A method for data transmission via data networks, in particular via ethernet-based data networks, having at least two participants; the data networks have at least one topological real-time field and one topological non-real-time field, and data telegrams sent via the data networks have at least one real-time part and at least one non-real-time part. By a coupling unit, data telegrams from the non-real-time field which arrive inside the real-time part are delayed and transmitted to the non-real-time part.

8 Claims, 4 Drawing Sheets

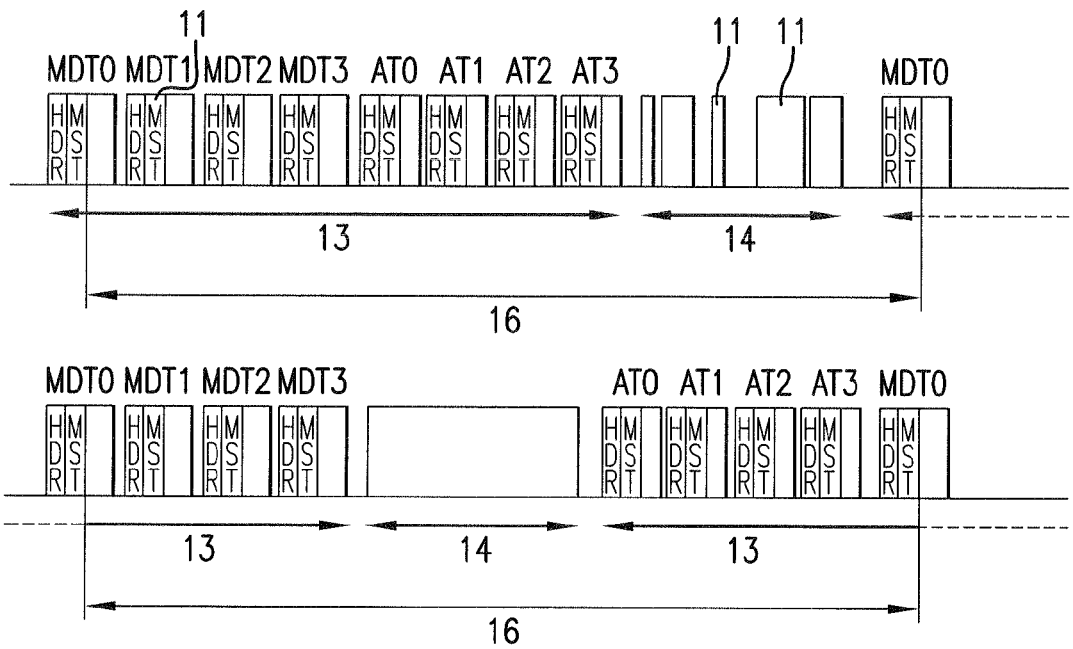
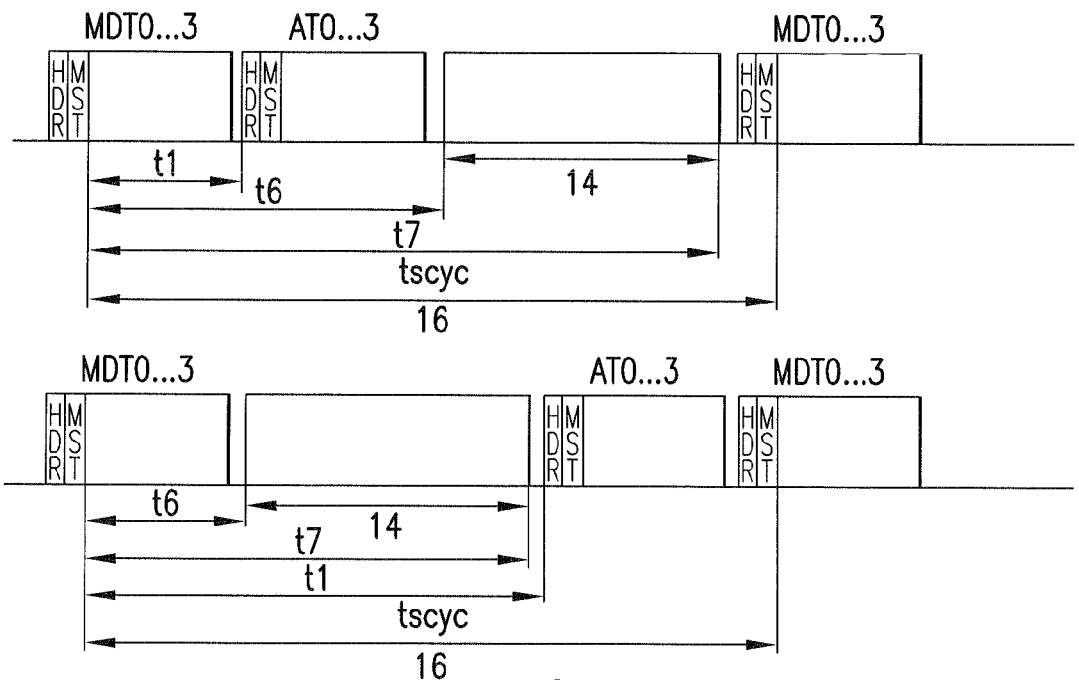
FIG.5

- MHP-ADR=0xFF (HP0-Parameter)
- Bit5-0:     00 0000 – no function
              00 0001 – tScyc
              00 0010 – t1
              00 0011 – t6
              00 0100 – t7
              00 0101 – reserved
              00 0110 – reserved
              00 0111 – reserved
              00 1000 – MDT0 length
              00 1001 – MDT1 length
              00 1010 – MDT2 length
              00 1011 – MDT3 length
              00 1100 – AT0 length
              00 1101 – AT1 length
              00 1110 – AT2 length
              00 1111 – AT3 length
              additional codes of several hardware-related
-     Parameter (content of MDT0-CP0)
- MHP-ADR=device address (HP1-Parameter)
- Bit5-0:     10 0001 – MDT-SVC pointer
              10 0010 – MDT-RTD pointer
              10 0011 – AT-SVC pointer
              10 0100 – AT-RTD pointer
              more?
- Bit9-6:     0 – reserved
  Bit10:      0 – transmission via HP field
              1 – switch to SVC
- Bit15-11:   0 – reserved

FIG.9

METHOD FOR DATA TRANSMISSION VIA DATA NETWORKS

CROSS-REFERENCE TO A RELATED APPLICATIONS

The present application is a continuation of U.S. application Ser. No. 11/672,777 filed on Feb. 8, 2007 which is now U.S. Pat. No. 7,940,803.

The invention described and claimed hereinbelow is also described in German Patent Application DE 10 2006 006 508.5 filed on Feb. 10, 2006. This German Patent Application, whose subject matter is incorporated here by reference, provides the basis for a claim of priority of invention under 35 U.S.C. 119(a)-(d).

BACKGROUND OF THE INVENTION

The present invention relates to real-time communications systems and in particular to ethernet-based data networks. Real-time communications systems known from the prior art have the problem that standard ethernet participants cannot be integrated directly into the communications system, or standard ethernet participants cannot be coupled directly with a real-time communications system. The present invention is described in particular in the field of ethernet-based communications systems, for which a simple realization of a coupling unit is shown.

A real-time communications system essentially comprises many participants. In a special embodiment, which is typically employed in automation applications, the system has primary participants (so-called masters) and secondary participants (so-called slaves).

Within this real-time communications system, data are exchanged in the form of real-time telegrams. In these real-time telegrams, their precise position is decisive to enable putting together information correctly. Besides these real-time telegrams, there are also data exchange mechanisms that do not proceed in real time. These mechanisms are used for instance for startup and for display, for instance for diagnostic purposes, where time demands are low.

The term "real-time communication" is understood as communication in which the specified activities are performed virtually without any time lag, or in other words typically with a guaranteed maximum delay that is known beforehand to other systems.

In such communications systems, there is often a need to make access possible to the various participants of the communications system. For this purpose, PCs are generally used that have no direct coupling to the real-time communication. These PCs must be coupled to the system via coupling units. The coupling of PCs to the communications system is done for instance by means of network participants. It is also usual to couple PCs to the "ethernet (Office)". The coupling function is performed by individual real-time communication participants.

SUMMARY OF THE INVENTION

The present invention thus has the object of making a method for data transmission available that permits systems or devices that cannot be integrated directly into a real-time communication to be coupled.

This is achieved by a method, a communications device, and a coupling unit in accordance with the present invention.

In the method of the invention for data transmission via data networks and in particular via ethernet-based data networks, having at least two participants, the data networks having at least one topological real-time field and one topological non-real-time field, and data telegrams sent via the data networks have at least one real-time part and at least one non-real-time part, according to the invention, by means of a coupling unit, data telegrams from the non-real-time field, which arrive within the real-time part, are delayed and transmitted to the non-real-time part.

The present invention relates in particular to data networks that at least in part are repeating data networks. Both purely repeating and mixed repeating and/or switched data networks are conceivable. Preferably, however, the repeater functionality is obligatory.

The term "topological real-time field" is understood to mean a localizable field inside the data network. The terms "real-time part" and "non-real-time part" are understood particularly, but exclusively, to mean chronological parts. The individual real-time or non-real-time parts, however, may also be defined by a position within one communications cycle.

By the chronological delay of data telegrams from the non-real-time part and their transmission to the non-real-time part, conflict situations in real-time-critical communications can be prevented. This non-real-time part is relevant particularly in the real-time field, that is, the region in which so-called real-time-critical data are transmitted.

Preferably, data telegrams are also taken from the non-real-time part (inside the real-time field) and transmitted to the non-real-time field. Proceeding in this way is the reverse transmission direction with respect to the above transmission of data telegrams from the non-real-time field to the real-time field. Preferably, this involves those data telegrams which are transmitted from the non-real-time field to the real-time field and those data telegrams that are transmitted from the real-time field to the non-real-time field are different data telegrams, which illustrates the fact that data telegrams can be transmitted bidirectionally. Preferably, data telegrams are also taken from the real-time part (within the real-time field) and transmitted to the non-real-time field. In this case as well, a transmission of data telegrams takes place from the real-time field to the non-real-time field.

The data are preferably transmitted in the form of communications cycles, and especially preferably, these communications cycles have predetermined time spans. In this case, the communication in real-time systems takes place in the communications cycles, and a communications cycle substantially comprises two parts, namely the part for real-time communication and the part for non-real-time communication. The real-time communication part, or real-time part (hereinafter also called the RT channel), is typically administered by the primary participant, and the transmission corrections are issued by this participant. The data telegram in this RT channel are preferably repeated by the participants.

There is also a so-called non-real-time part (hereinafter also called the IP channel), which involves a time range during which no transmission corrections have to be issued. In this time range, every participant can occupy the communications system. To avoid collisions in this IP channel, or to regulate it, a change can be made from the repeater function to a switched function for the period of time of the IP channel (this is called switching the data telegrams in the IP channel). Within the communications cycles, both chronological real-time parts and chronological non-real-time parts occur.

Preferably, the non-real-time part is defined variably within one communications cycle.

Preferably, the coupling unit ascertains parameters which are characteristic for the position of at least the non-real-time part within one communications cycle. More precisely, these parameters are learned. Preferably, the parameters are selected from a group of parameters which contains the starting times of the non-real-time part, the ending times of the non-real-time part, the chronological length of the non-real-time part, the chronological length of the real-time part, and the like. In particular, the values for the starting time of the non-real-time part and the ending time of the non-real-time part are needed in order to determine the position of the non-real-time part.

Advantageously, the chronological length of the non-real-time part is also determined. From these parameters, that is, from the reception time of the non-real-time telegrams and real-time telegrams, the coupling unit can find the time range of the IP channel by calculating the region for the IP channel by means of the earliest and latest reception time and the respective telegram lengths. Since the telegram recognition of the real-time telegrams (RT channel) differs from that in the IP channel, the coupling unit can distinguish the telegrams in the time range of the IP channel from those in the time range of the RT channel. In other words, the position of the non-real-time part is ascertained by evaluating the reception times of telegrams received.

From the prior art, no coupling units which function with a mixed function comprising a repeater and a switch are known. The coupling units in the prior art require parameters and must be parametrized, for instance from a primary participant, in order to know the location of the IP channel. This means that the coupling units known from the prior art must each be independent network nodes that can also be addressed from the primary station. That is, a network address for instance is needed as well as specialized management of the node and an address setting of the node. The method of the invention thus represents a drastic simplification of the methods known from the prior art.

The position of the non-real-time part is preferably also ascertained by evaluation of the reception times of received data telegrams and especially preferably of non-real-time telegrams.

The present invention is also directed to a use of a method of the type described above for ethernet-based communications systems. The present invention is moreover directed to a use of the above-described method for real-time communication systems in general. The invention is directed in particular to the use of a method of the type described above for a network that is at least also repeating, that is, a network in which not merely switching is done but at least also repeating. The invention is thus applicable to purely repeating networks as well. The processes described here proceed in particular in the lower layers of the OSI reference model.

The invention is furthermore directed to a communications device for transmitting data, in which the communications device has at least one first participant and at least one second participant as well as one coupling unit for connecting at least one further participant to the communications device. In addition the communications device has least one topological real-time field and one topological non-real-time field, and data telegrams transmitted by the communications device contain at least one real-time part and one non-real-time part.

According to the invention, the coupling unit has a control unit, which causes data telegrams from the non-real-time field, which arrive at the coupling unit within the real-time part, to be delayed and transmitted to the non-real-time part of a communications cycle. In this way, a problematic collision with real-time-critical data can be averted.

Preferably, the control unit causes data telegrams to be taken from a non-real-time part and transmitted to the non-real-time field. This means that here as well, data telegrams can be transmitted from the real-time field to the non-real-time field. The control unit furthermore causes data telegram parts to be taken from a real-time part and transmitted to the non-real-time field. The term "data telegrams" can be described within the context of the present invention as both individual data telegrams and various pluralities of data telegrams.

Preferably, the coupling unit automatically ascertains parameters which are characteristic for the position of the non-real-time part within the communications cycles.

The present invention is also directed to a coupling unit for a communications device for transmitting data, in particular via ethernet-based data networks, with many participants, which has at least one real-time field and at least one non-real-time field. The data telegrams transmitted by the communications device include at least one real-time part and one non-real-time part.

According to the invention, the coupling unit has a control unit, which causes data telegrams from the non-real-time field, which arrive at the coupling unit within the real-time part, to be delayed and transmitted to the non-real-time part.

The present invention is also directed to the use of a coupling unit described above for an at least also repeating network.

Further advantageous embodiments will become apparent from the accompanying drawings.

BRIEF DESCRIPTION OF THE DRAWINGS

FIG. 4 is an illustration of a communications cycle;

FIG. 5 is an illustration showing the chronological parameters of a communications cycle;

FIG. 9 is an example of a control command field (control word field).

DESCRIPTION OF THE PREFERRED EMBODIMENTS

Figure 1:
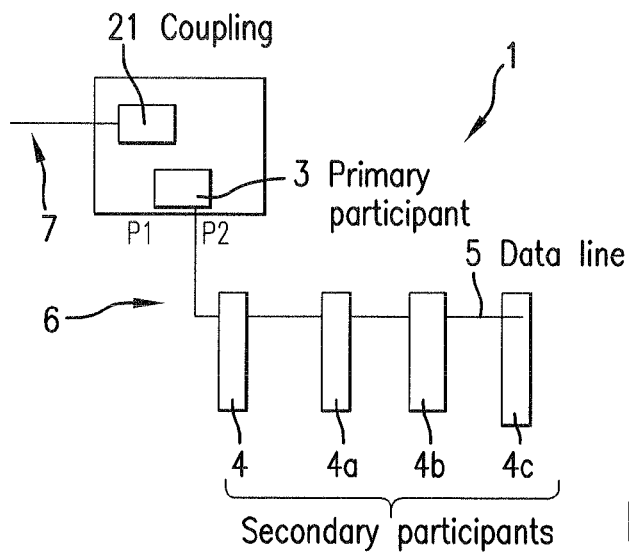
FIG. 1 is a block diagram illustrating the structure of a real-time communications system.

FIG. 1 shows a block diagram of the structure of a real-time communications system 1, of the kind used particularly for automation purposes. This system has a primary participant and participants 4, 4a, 4b, 4c. Between this primary participant and the secondary participants, data in the form of real-time telegrams are exchanged. The reference numeral 6 pertains to a real-time field of the communications system. The primary participant has two lines P1 and P2 for corresponding data lines. The secondary participant 4b in this embodied is an I/O interface. Reference numeral 21 pertains to a coupling for the (topological) non-real-time field, for instance in the form of ethernet (Office), and reference numeral 5 pertains to a data line.

Figure 2:
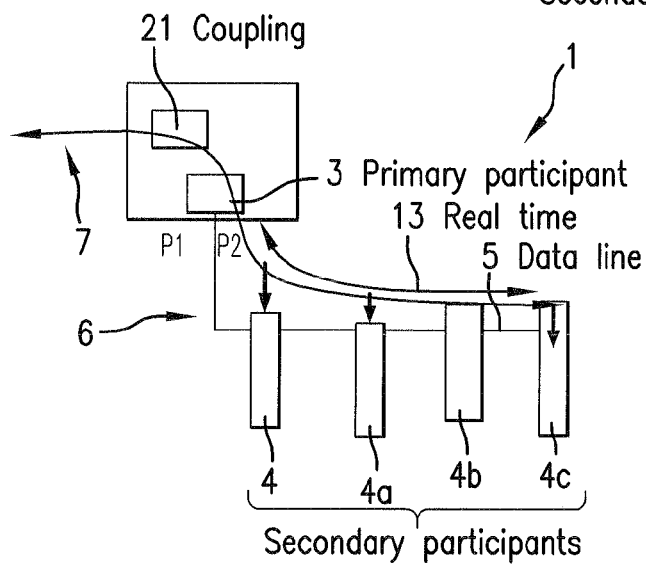
FIG. 2 is the block diagram of FIG. 1 illustrating the data flows.

In FIG. 2, the data flows between the individual participants are shown. Between the primary participant 3 and the secondary participants 4, 4a, 4b and 4c, real-time-critical data are exchanged, which is illustrated by the real-time channel (RT channel) 13. In addition, non-real-time-critical data are exchanged between the various participants via an IP channel 14. This is the case for instance whenever access to the individual participants of the communications system, for instance by PCs, is desired.

Figure 3:
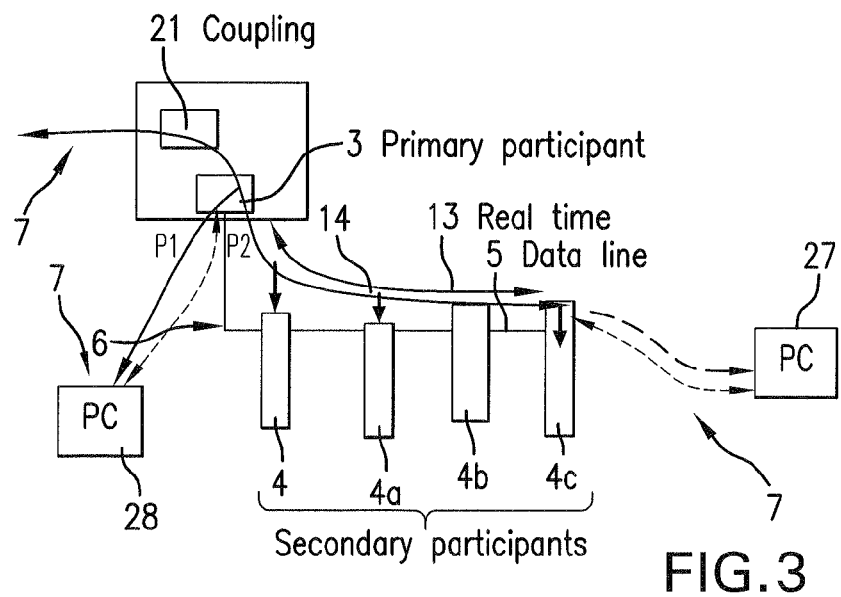
FIG. 3 shows instances known from the prior art of coupling standard ethernet participants.

In the embodiment shown in FIG. 3, a situation is shown in which PCs 27 and 28 are used that have no direct coupling to the real-time communications system. These PCs must be coupled to the system via coupling units. In this respect, it is known from the prior art that the non-real-time participants identified by reference numerals 27 and 28 are coupled to the communications system by network participants. A coupling of a PC to "ethernet (Office)" is also usual. The various real-time communication participants take on the coupling function here. In the illustration shown in FIG. 3, the PCs are coupled via the input P1 or the via the last secondary participant 4c. In these systems, the coupling requires that the individual participants know the chronological distribution of the various communications cycles and the positions of the IP and RT channels.

The last participant 4c shown in FIG. 3 employs its internal bridge function. As a result, it is attained that the RT channel is not interfered with by IP data of the telegrams. The primary participant 3 supports the IP data transmission via the input P1.

FIG. 4 shows an illustration of a communications cycle 16. In the embodiment shown at the top, this communications cycle 16 has one real-time part 13 and one non-real-time part 14, and data telegrams 11 are located within each of these parts. In the lower illustration, the communications cycle 16 has one non-real-time part, which is located between two real-time parts 13.

Data fields (HDR/MST) for synchronization and administration are located inside the real-time part.

As shown in FIGS. 4 and 5, the location of the IP channel or non-real-time part within the communications cycle 16 is defined by a predetermined constant time range. This time range is typically specified by the primary participant. It is then possible for the location of this IP channel to be transmitted), for instance within the initialization phase, from the primary participant to the secondary participant.

In the prior art, the location of the IP channel is transmitted to the secondary participants from the primary participant explicitly as so-called parameters. The secondary participants must therefore, as noted above, have an accessible parameter memory that the primary station can describe. In contrast, in the invention the times t6 and t7 in FIG. 5 are the parameters that describe the location of the IP channel within the communications cycle, since time t6 represents the starting time of the non-real-time part 14, and time t7 represents the ending time of the non-real-time part 14. The time tscyc represents the total time of the communications cycle 16.

To avoid interference with the real-time communication, data telegrams from the non-real-time field, which is identified in FIG. 3 by reference numeral 7, are fed by the coupling units into the real-time field in such a way that the real-time communication is not interfered with. This means that the data must be input into the IP channel. In addition, as noted above, data telegrams from the IP channel and optionally also from the RT channel can be input into the non-real-time field 7.

Figure 6:
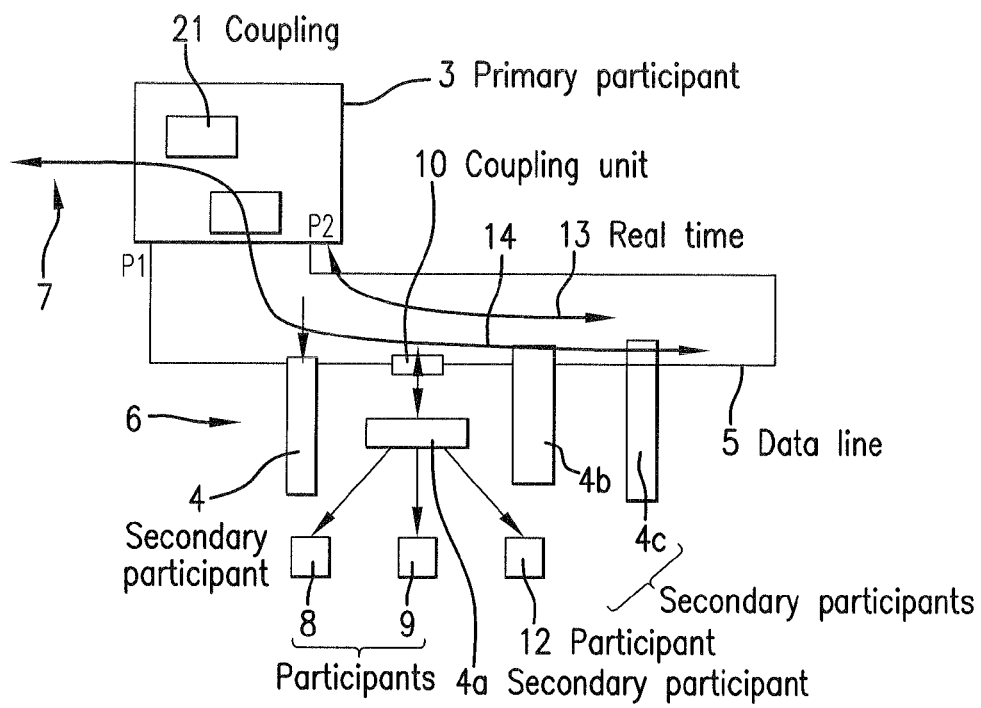
FIG. 6 is a drawing of a communications structure having a router participant.

FIG. 6 shows a communications device according to the invention, with a coupling unit 10. In contrast to coupling units known from the prior art, according to the invention a separate coupling unit (also called an IP T-plug) is described, which for the communications systems in question here, which include a mixture of repeater function and switched bus communication, was not known until now.

In contrast to the coupling units known from the prior art, the coupling unit of the invention is not a network participant with its own network address. Thus it is also not visible as a node in the communications network, but merely routes the data transparently from the non-real-time field (shown in FIG. 6 as an ethernet switch 4a with three participants 8, 9 and 12) into the IP channel in the real-time field. This coupling unit 10 does not contain any parameters that have to be set; instead, it ascertains the necessary parameters, which as noted above involve at least the parameters t6 and t7, automatically. Advantageously, the value for the time span tscyc is also ascertained. The coupling unit 10 of the invention is an element that is passive with respect to the real-time communication. This coupling unit processes only the IP channel, and therefore, as noted above, the times t6 and t7 must be evaluated. In addition, the telegram MDT 0, which is shown in FIGS. 4 and 5, must be evaluated. An IP telegram, because of the time lag (ring delay) of the P and S channels, should be input into only one channel (P or S), so that the entire device can be implemented more simply.

Figure 7:
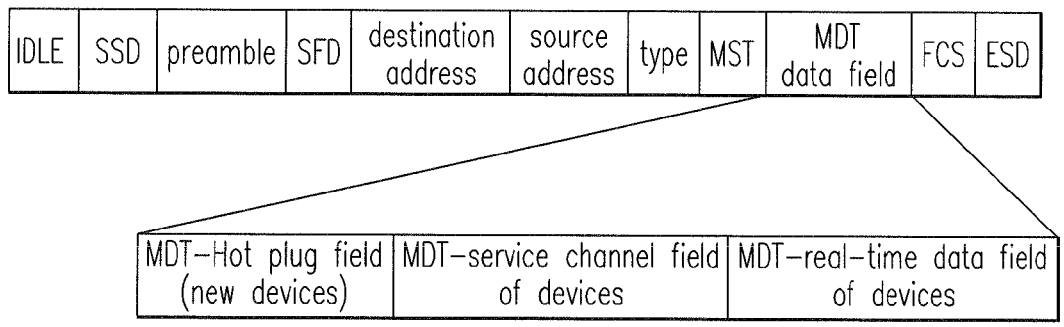
FIG. 7 shows a data field.
Figure 8:
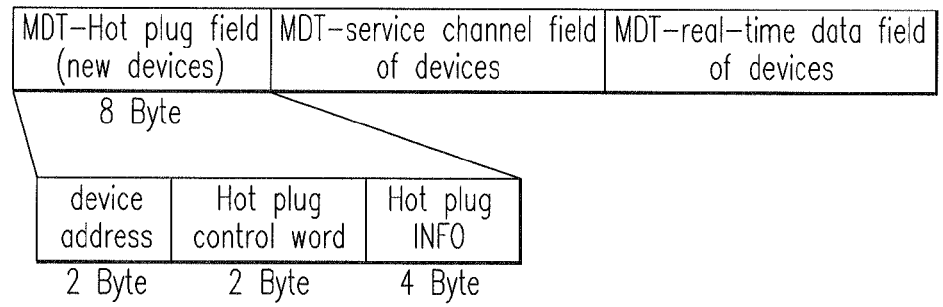
FIG. 8 is a detailed view of the data field of FIG. 7.

FIGS. 7 and 8 describe a self-learning coupling unit using telegram evaluation for content. If within one cyclical channel the information about the location of the IP channel at a position known for the coupling unit is transmitted in data telegrams then the coupling unit, from this evaluation of the telegram contents, can ascertain the chronological location of the IP channel.

As FIG. 7 shows, the so-called hot-plug field that occurs in SERCOS III (Serial Real-Time Communication System) could be used for this purpose. In SERCOS III, besides such data parts as the source address, destination address, the preamble, and the FCS (frame check sequence) data field, the MDT data field is also transmitted. This MDT data field is composed of an MDT hot-plug field, which is normally used for taking in new participants to be added; the MDT service channel field of devices; and the MDT real-time data field of devices.

As FIG. 8 shows, the so-called MDT hot-plug field is in turn composed of subsidiary fields that are intended for the equipment address, a control word, and an information field.

In a preferred embodiment, it is proposed that the latter hot-plug information field be occupied by the times t6 and t7. These and other data are transmitted in the field preferably in multiplexed fashion, as long as no new participant is to be taken on. Thus during this time, a coupling unit can ascertain the times by evaluating the entire data telegram.

FIG. 8 shows one possible agreement for the aforementioned hot-plug control word for multiplexing. Of particular importance here are the two codes for t6 and t7, which are evaluated by the copling unit; in this example the data are relevant only in the case where MHP-ADR=0xFF, which means that no new participant is to be taken in. The values for tscyc and ti can also be transmitted.

In this embodiment, information is thus preferably multiplexed within a predetermined data field.

All the characteristics disclosed in the application are claimed as essential to the invention, to the extent that they are novel either individually or in combination over the prior art.

It will be understood that each of the elements described above, or two or more together, may also find a useful application in other types of methods and constructions differing from the type described above.

While the invention has been illustrated and described as embodied method for data transmission via data networks, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method for data transmission, comprising the following steps:
    providing a data network having at least two participants and at least one topological real-time field and one topological non-real-time field, wherein said data network is at least in part a repeating data network, and wherein said at least two participants comprise at least one primary master participant and at least one secondary slave participant;
    producing data telegrams containing at least one real-time part and at least one non-real-time part;
    sending said data telegrams containing said at least one real-time part and at least one non-real-time part via the data network;
    providing a coupling unit;
    routing the data telegrams by the coupling unit from the at least one non-real time field into an Internet Protocol channel in the at least one real-time field, wherein the coupling unit is passive with respect to real-time communication;
    processing by said coupling unit of only the Internet Protocol channel;
    calculating by the coupling unit of a permitted region by using an earliest and latest receipt time and respective telegram lengths;
    delaying the data telegrams from the non-real-time field that arrive within the real-time part and transmitting said data telegrams from the non-real-time filed arriving within the real-time part to the non-real-time part via said coupling unit,
    wherein said data network is comprised by a real-time communication system for automation purposes comprising input/output interfaces; and
    ascertaining the position of the non-real-time part by evaluation of reception times of received data telegrams.

2. The method as defined in claim 1; and further comprising transmitting the data in form of communication cycles.

3. The method as defined in claim 2; and further comprising providing in the communication cycles a predetermined constant cycle time span (tscyc).

4. The method as defined in claim 1; and further comprising defining the non-real-time part variably within one communication cycle.

5. The method as defined in claim 1; and further comprising ascertaining by the coupling unit parameters which are characteristic for a position of at least the non-real-time part within one communication cycle.

6. The method as defined in claim 5; and further comprising selecting the parameters from a group of parameters which contain a starting time of the non-real-time part, an ending time of the non-real-time part, and a chronological length of the non-real-time part, the chronological length of the real-time part.

7. The method as defined in claim 1; and further comprising ascertaining the position of the non-real-time part by evaluation of reception times of received data telegrams.

8. The method as defined in claim 1; further comprising ascertaining a position of the non-real-time part by evaluation of reception times of received non-real-time part telegrams.

* * * * *